United States Patent [19]
Kocher

[11] Patent Number: 5,903,651
[45] Date of Patent: May 11, 1999

[54] APPARATUS AND METHOD FOR DEMONSTRATING AND CONFIRMING THE STATUS OF A DIGITAL CERTIFICATES AND OTHER DATA

[75] Inventor: Paul Carl Kocher, Menlo Park, Calif.

[73] Assignee: ValiCert, Inc., Mountain View, Calif.

[21] Appl. No.: 08/645,759

[22] Filed: May 14, 1996

[51] Int. Cl.$^6$ .................. H04K 1/00; H04L 9/00
[52] U.S. Cl. .................................. 380/25; 380/23
[58] Field of Search ........................ 380/23, 25

[56] References Cited

U.S. PATENT DOCUMENTS

| | | | |
|---|---|---|---|
| Re. 34,954 | 5/1995 | Haber et al. | 380/49 |
| 4,309,569 | 1/1982 | Merkle | 380/25 |
| 4,405,829 | 9/1983 | Rivest et al. | 178/22.1 |
| 4,661,658 | 4/1987 | Matyas | 380/23 |
| 4,868,877 | 9/1989 | Fischer | 380/25 |
| 4,879,747 | 11/1989 | Leighton et al. | 380/23 |
| 4,881,264 | 11/1989 | Merkle | 380/25 |
| 4,944,009 | 7/1990 | Micali et al. | 380/46 |
| 4,995,081 | 2/1991 | Leighton et al. | 380/23 |
| 5,016,274 | 5/1991 | Micali et al. | 380/23 |
| 5,202,986 | 4/1993 | Nickel | 395/600 |
| 5,224,163 | 6/1993 | Gasser et al. | 380/39 |
| 5,231,666 | 7/1993 | Matyas | 380/25 |
| 5,261,002 | 11/1993 | Perlman et al. | 380/30 |
| 5,351,302 | 9/1994 | Leighton et al. | 380/30 |
| 5,380,047 | 1/1995 | Molee et al. | 283/86 |
| 5,406,628 | 4/1995 | Beller et al. | 380/30 |
| 5,416,842 | 5/1995 | Aziz | 380/30 |
| 5,420,927 | 5/1995 | Micali | 380/23 |
| 5,432,852 | 7/1995 | Leighton et al. | 380/30 |
| 5,434,919 | 7/1995 | Chaum | 380/30 |
| 5,499,296 | 3/1996 | Micali | 380/23 |
| 5,519,778 | 5/1996 | Leighton et al. | 380/30 |

(List continued on next page.)

FOREIGN PATENT DOCUMENTS

WO 97/16905  5/1997  WIPO ................. H04L 9/32

OTHER PUBLICATIONS

Ralph C. Merkle, "Secrecy, Authentication, and Public Key Systems," UMI Research Press, 1982, Chapter 9.

Merkle, Ralph C., "Secrecy, Authentication, and Public Key Systems," A Dissertation submitted to the Dept. of Electrical Engineering and the Committee of Graduate Studies, Stanford Univ., Jun. 1979.

(List continued on next page.)

Primary Examiner—Gail O. Hayes
Assistant Examiner—Hrayr A. Sayadian
Attorney, Agent, or Firm—Blakely, Sokoloff, Taylor and Zafman LLP

[57] ABSTRACT

Methods and apparatuses for providing cryptographic assurance based on ranges as to whether a particular data item is on a list. According to one computer-implemented method, the items on the list are sorted and ranges are derived from adjacent pairs of data items on the list. Next, cryptographically manipulated data is generated from the plurality of ranges. At least parts of the cryptographically manipulated data is transmitted onto a network for use in cryptographically demonstrating whether any given data item is on the list. According to another computer-implemented method, a request message is received requesting whether a given data item is on a list of data items. In response, a range is selected that is derived from the pair of data items on the list that define the smallest range that includes the given data item. A response message is transmitted that cryptographically demonstrates whether the first data item is on the list using cryptographically manipulated data derived from the range. According to another computer-implemented method, a request message requesting an indication as to whether a first data item is on a list of data items is transmitted. In response, a message is received that cryptographically demonstrates whether the first data item is on the list, where the response message identifies a range that is derived from the pair of data items on the list that defines the smallest range that includes the first data item.

11 Claims, 15 Drawing Sheets

U.S. PATENT DOCUMENTS

| | | | |
|---|---|---|---|
| 5,537,475 | 7/1996 | Micali | 380/30 |
| 5,588,060 | 12/1996 | Aziz | 380/30 |
| 5,594,921 | 1/1997 | Pettus | 395/831 |
| 5,604,804 | 2/1997 | Micali | 380/25 |
| 5,615,269 | 3/1997 | Micali | 380/49 |
| 5,629,982 | 5/1997 | Micali | 380/30 |
| 5,638,446 | 6/1997 | Rubin | 380/25 |
| 5,657,390 | 8/1997 | Elgamal et al. | 380/49 |
| 5,659,616 | 8/1997 | Sudia | 380/23 |
| 5,664,184 | 9/1997 | Ferguson et al. | 395/614 |
| 5,666,414 | 9/1997 | Micali | 380/21 |
| 5,666,416 | 9/1997 | Micali | 380/23 |
| 5,668,877 | 9/1997 | Aziz | 380/30 |
| 5,687,235 | 11/1997 | Perlman et al. | 380/25 |
| 5,699,431 | 12/1997 | Van Oorschot et al. | 380/30 |
| 5,712,914 | 1/1998 | Aucsmith et al. | 380/30 |
| 5,748,738 | 5/1998 | Bisbee et al. | 380/25 |
| 5,774,552 | 6/1998 | Grimmer | 380/25 |
| 5,781,629 | 7/1998 | Haber et al. | 380/23 |
| 5,787,175 | 7/1998 | Carter | 380/25 |
| B1 5,276,737 | 9/1995 | Micali | 380/30 |
| B1 5,315,658 | 5/1994 | Micali | 380/30 |

OTHER PUBLICATIONS

WO 97/16905 International Publication Date May 9, 1997 for International Application No. PCT/US/96/17373.

WO 97/26728 International Publication Date Jul. 24, 1997 for International Application No. PCT/US96/19925.

Schneier, B., "Applied Cryptography, Second Edition," Published by John Wiley & Sons, Inc. 1996, Chapters 2, 5, 8 and 24.

Santosh Chokhani: "Toward a National Public Key Infrastructure" IEEE Communications Magazine, vol.32, No. 9, Sep. 1, 1994.

Silvio Micali, "Enhanced Certificate Revocation System", Written report prepared for the Nov. 2, 1995, Federal PKI meeting.

Silvio Micali, "Alternative Approaches to Certificate Revocation", Written report prepared for the Sep. 5–6, 1996 X9FI working group meeting.

APPARATUS AND METHOD FOR DEMONSTRATING AND CONFIRMING THE STATUS OF A DIGITAL CERTIFICATES AND OTHER DATA

REFERENCES CITED

U.S. PATENT DOCUMENTS

| | | | |
|---|---|---|---|
| 4,405,829 | 9/1983 | Rivest et al. | 178/22.1 |
| 4,309,569 | 1/1982 | Merkle | 178/22.08 |
| 4,881,264 | 11/1989 | Merkle | 380/25 |

PUBLICATIONS

ISO 9594-8, *Information Technology—Open Systems Interconnection —The Direction: Authentication framework*, Sep. 15, 1995.

National Institute of Standards and Technology, NIST FIPS PUB 190, "Secure Hash Standard," U.S. Department of Commerce, May 1993.

National Institute of Standards and Technology, NIST FIPS PUB 186, "Digital Signature Standard," U.S. Department of Commerce, May 1994.

B. Schneier, *Applied Cryptography* (2nd ed.), John Wiley and Sons, 1996.

FIELD OF THE INVENTION

This invention relates generally to data security, information security, and cryptography, and specifically to systems for constructing digitally-signed lists and determining whether particular values are present on such lists. The invention has specific application to revocation of digital certificates or other types of digital data items and for determining whether such data items have been revoked.

DESCRIPTION OF THE BACKGROUND ART

Asymmetric (public key) cryptologic techniques are widely used in security protocols for applications such as secure e-mail, electronic commerce, encrypted voice and video communications, and security on the World Wide Web. The RSA cryptosystem, described in U.S. Pat. No. 4,405,829 to Rivest et al. (1983), and the Digital Signature Algorithm (DSA), described in U.S. Pat. No. 5,231,668, to Kravitz, are examples of asymmetric functions. Asymmetric cryptosystems systems typically involve a secret private key, which is used for digital signing or decryption, and a non-confidential public key derived from the private key, which is used for signature verification or encryption. For general information about RSA, DSA, and other asymmetric cryptosystems, the reader is referred to *Applied Cryptography*.

Before using a public key to encrypt a confidential message or verify a signature, a party in an electronic communications protocol generally must confirm the identity of the party holding the private key. An electronic communications protocol defines conventions allowing two or more computers or other electronic devices to exchange digital data or messages via a communications channel. Without such confirmation, an attacker could substitute a legitimate public key with another for which the attacker knows the private key. Digital certificates are the most common solution to this problem. The holder of the private key provides its corresponding public key to a widely-trusted Certificate Authority (CA) along with acceptable identification. The CA then issues a certificate, which typically consists of a digital signature on a specially-formatted block of data containing the user's name, the user's public key, the certificate issuance and expiration dates, and the certificate serial number. The recipient of a digital certificate who trusts the issuing CA can use the CA's (already trusted) public key to verify the signature. If the signature is valid and if the CA is trustworthy, the recipient can trust that the person identified in the certificate holds the private key corresponding to the public key in the certificate. The ISO 9594-8 standard defines techniques and data formats for computing and verifying digital signatures and certificates.

Certificates often need to be revoked due to unexpected events such as compromise, theft, or loss of the device containing the private key. A certificate might also need to be revoked if a user has lost the privileges granted by the certificate. In general, a certificate's status might be good, revoked, or pending, as well as other possibilities that will be appreciated by those skilled in the art.

In large open networks such as the Internet, certificate status determination, specifically certificate revocation, presents enormous challenges. The Internet is expected to have hundreds of millions of users worldwide soon. It is desirable that certificate revocation messages propagate as quickly as possible to all users who might otherwise accept the invalid certificate. Thus there are difficult design constraints which a successful system must satisfy:

1. Network applications are sensitive to latency. A good solution should minimize the number of additional network connections and data exchanges required.

2. The system must work on a global scale and work on a broad range of systems with different levels of connectivity.

3. The system must be distributable so that critical information can be cached in many locations at once to minimize the number of long-distance network connections.

4. The system must be cryptographically secure. Previous certificate revocation mechanisms, such as ISO 9594-8, use a type of digitally-signed structure called a Certificate Revocation List (CRL) which is issued periodically by the CA and lists the serial numbers of certificates issued by the CA which have been revoked. FIG. 1 shows the structure of a typical CRL 101, which consists of the issuer's name, a field identifying the signature algorithm, the date and time of issuance, and a list of revoked certificates, followed by a digital signature of the above information. To determine if a particular certificate is revoked, one obtains an up-to-date CRL from the appropriate CA, verifies that the digital signature in the CRL is valid, then searches the list of revoked certificates to determine whether the certificate in question is revoked. If the certificate is not on the list, it is assumed to be valid.

Because the complete CRL must be obtained and verified to determine the revocation status of a single certificate, CRLs do not scale well to large networks. In particular, existing certificate revocation mechanisms suffer from a number of disadvantages:

(a) CRLs can become extremely large, making them inefficient to transmit or process. For example, a very large system might have several million revoked certificates, resulting in CRLs which are many megabytes in size. To determine whether a particular certificate is valid, one must download a recent CRL in its entirety and process the entire list to verify the digital signature. For a large network, the required network bandwidth can be prohibitively large, especially if every user needs to download new CRLs often. The time required to process a large list can also be an issue.

(b) Only mechanisms recognized and supported by the certificate recipient can be used to revoke certificates. In most cases, only revocations issued by the CA are accepted. Additional revocation mechanisms cannot be added easily.

(c) Because CAs are entrusted with both certificate issuance and revocation, physical destruction of a CA's private key could result in a situation where certificates could no longer be revoked without revoking the CA's public key.

(d) Verifiers must be able to obtain up-to-date CRLs from every supported CA. Certificate chaining makes this particularly difficult since there can easily be an extremely large number of CAs and multiple CAs per certificate chain.

Present techniques for determining whether types of data other than certificates are present on digitally-signed lists suffer from the same scalability problems. on large networks such as the Internet such systems will typically suffer from poor latency and extremely large bandwidth requirements. These limitations arise because existing techniques either require active network connections to a trusted server at transaction time or require replication of CRLs or other digitally-signed lists containing all elements of the list.

SUMMARY OF THE INVENTION

Accordingly, it is an object of the invention to reduce greatly reduce the processing effort, network bandwidth, network latency, data storage, and data replication requirements needed to determine whether a particular certificate has been revoked. In particular, the invention allows certificate status to be determined without knowledge of the entire list of revoked certificates and without having to search the entire list of revoked certificates.

Another object of the invention is to simplify the addition of new revocation mechanisms, such as revocation by certificate holders, without altering existing revocation mechanisms.

Another object of the invention is to allow revocations from many CAs to be included efficiently in a single database, thereby allowing a single trusted source for certificate revocation messages.

Another object of the invention is to provide a certificate revocation system whose operation is open to public scrutiny to ensure that certificates are not maliciously revoked and that revoked certificates are not marked as valid.

In general, the invention can be used to determine whether data items of any type are present on a digitally-signed list without requiring that the verifier retrieve the entire list. It should be readily apparent to a reader skilled in the art that the problem of determining securely whether a data item belongs to a list of data items has applications to many problems beyond certificate revocation. For example, an Internet user might want to determine whether a digitally-signed Java application has been revoked as having harmful side effects.

Briefly, the present invention typically includes at least one tree issuing device, one or more confirmation issuers, and at least one verification device.

The tree issuing device assembles a list of data items, which can have any content but would typically be a list of serial numbers identifying revoked digital certificates. The issuer sorts the list, optionally removes any duplicate entries, then adds a beginning-of-list marker and an end-of-list marker. Each pair of adjacent entries in this sorted list specifies a range between which there are no list entries. Except for the beginning and end markers, each list entry appears in two ranges, once as a minimum value and once as a maximum value. A hash tree is then constructed where leaf nodes correspond to ranges in the list. Because the tree's leaf nodes define intervals, this structure is referred to as an interval hash tree. A binary tree such as those described in U.S. Pat. No. 4,309,569 to Merkle (1982) would typically be used, but those skilled in the art will appreciate that a variety of other hash tree structures are also suitable (for example, as described in U.S. Pat. No. 4,881,264 to Merkle (1989)). Merkle uses hash trees to reduce the cost per signature when computing a large number of digital signatures by combining a large number of items into a single root node which can be digitally signed. Merkle's hash tree techniques produce assurances that particular items have been digitally signed. However, Merkle's hash trees do not provide the capability disclosed herein, of cryptographically demonstrating that particular items were not included in the tree (except in the highly inefficient case where the verifier obtains the entire tree and searches it for the particular candidate item).

The tree issuing device digitally signs the tree's root node (or nodes, if the chosen tree structure has multiple roots) with other data which would typically identify the issuer's identity and the date and time.

A confirmation issuer obtains the hash tree including the root node digital signature. The tree may be obtained either separately from, or together with, its digitally signed root. In the latter case, the hash tree shall be considered to include its digitally signed root(s). These values could be obtained directly from the tree issuer, be computed independently, or be obtained from other sources. The confirmation issuer can be the same device as the tree issuer, or could be an independent device connected to the tree issuer via a communications channel. Confirmation issuers might also be included in devices including, but not limited to, network servers, firewalls, or directory servers and might be assigned to serve a particular region of a network or subnetwork.

The verification device (verifier) begins with a "candidate data item" whose status on the list is to be determined. The verifier sends the candidate data item (or a representation thereof) to the confirmation issuer. The confirmation issuer locates a leaf node whose minimum range value is no larger than the candidate data item and whose maximum range value is no smaller than the candidate data item. The confirmation issuer then sends the verifier the appropriate range, the digitally-signed root node, and the additional nodes needed to cryptographically derive the root node from the leaf node. By cryptographically determining that the particular leaf can be used to reconstruct the root node, the verifier gains cryptographic assurance that the leaf was part of the original tree whose root node was digitally signed. The leaf is said to be cryptographically bound to the root. Note that the confirmation issuer does not need a private key, or knowledge of tree issuer's private key, since it does not generate any new digital signatures.

The verifier confirms that the signature on the header is correct and comes from a trusted tree issuer; that the date, name, and other information included in the root node digital signature are appropriate; that the root node can be constructed from the leaf node using the specified supporting nodes; and that the candidate data item is within the range specified by the given leaf node. If any of the above verification steps fail, the assurance is bad and item's status on the list cannot be determined. If the verification steps are successful and either range endpoint equals the data item, the verifier has cryptographic assurance that the data item is present on the list. If the smaller range endpoint is less than the data item and the larger endpoint is larger than the item, the verifier has cryptographic assurance that the item is not present on the list.

In addition to the embodiments described above, another illustrated embodiment does not use ranges, but rather uses a hash tree constructed from a sorted list of data items such that two adjacent leaves spanning a candidate data item provide cryptographic assurance that the candidate data item is not present on the list. Yet another illustrated embodiment does not use ranges, but rather uses the hash tree to build digitally signed assertions that specific items are not on the list. Still another illustrated embodiment does not use hash trees, but rather uses individually signed ranges.

DETAILED DESCRIPTION OF THE INVENTION

Methods and apparatuses are disclosed for constructing efficient cryptographically secure assertions as to whether candidate items are present on a list. In one embodiment of the invention, data items on the list are converted into a set of ranges having data items as endpoints such that there are no data items on the list between the endpoints of any range. The ranges are used as leaf nodes to construct a hash tree, then the tree's root node is digitally signed by the tree issuer. A verifier can determine the validity of a leaf node by checking the path from the leaf to the root node and by checking the digital signature on the root node. A valid leaf node with a range endpoint equal to a candidate data item provides cryptographic assurance that the candidate data item is present on the list. A valid leaf node with one range endpoint larger than the candidate data item and one range endpoint smaller than the candidate data item provides cryptographic assurance that the candidate data item is not on the list.

Hash Tree Construction and Issuance

Figure 1:
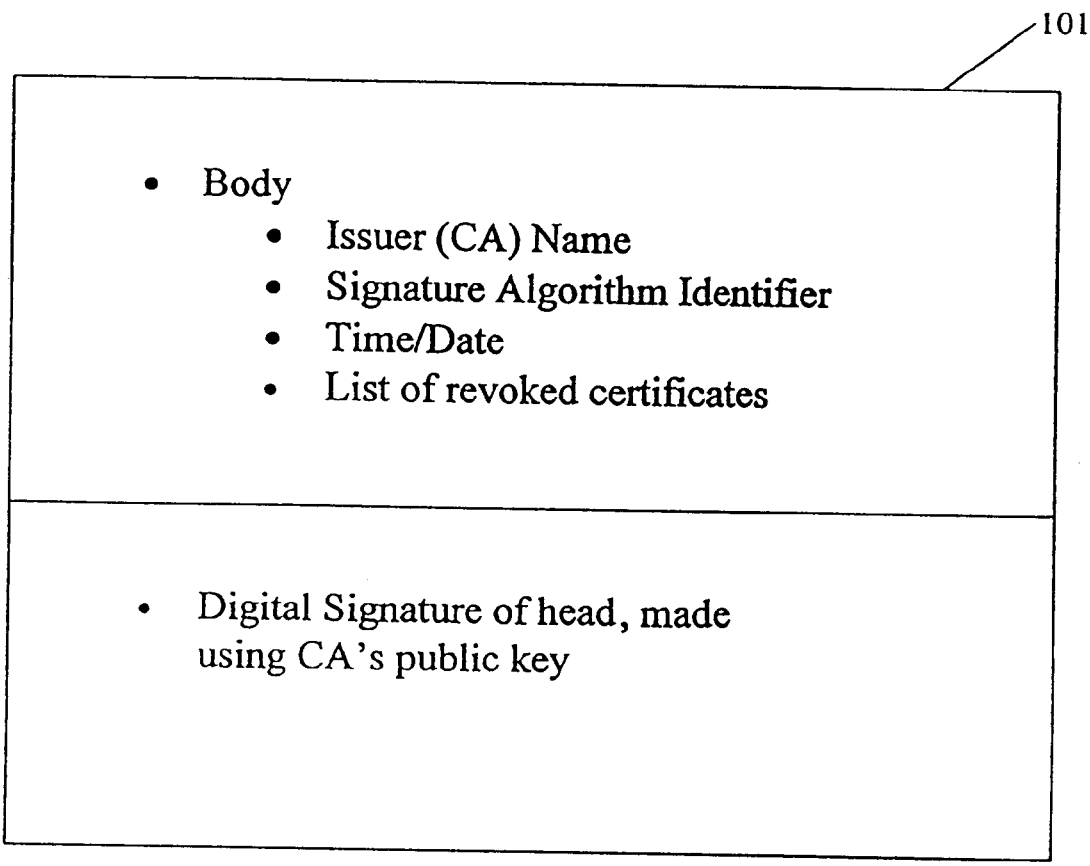
FIG. 1 shows the contents of a traditional certificate revocation list which does not use the present invention.
Figure 2:
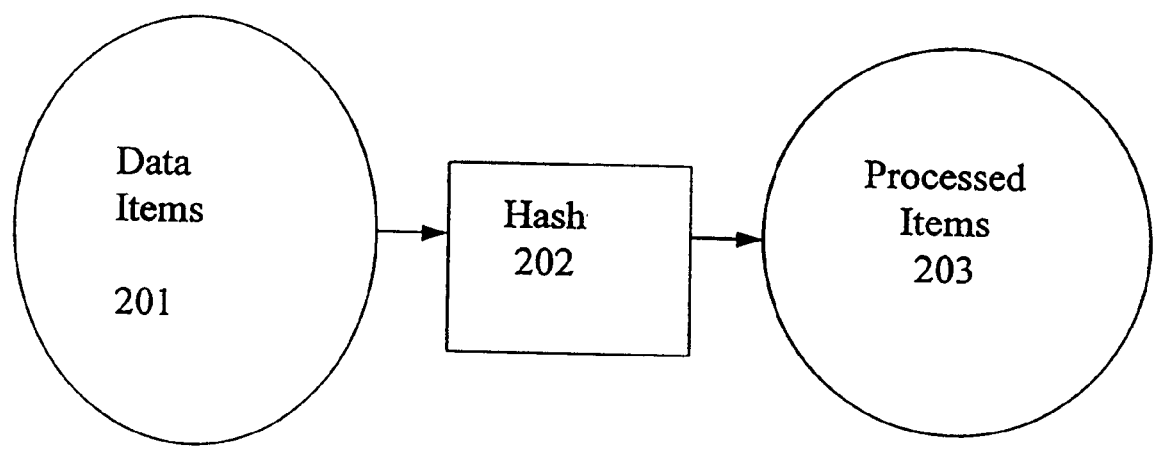
FIG. 2 shows an exemplary technique for preprocessing data items.

For certain kinds of data items, preprocessing using a collision-free function (CFF) may be performed before the data items are used for tree construction. A CFF is a function for which it is believed to be computationally unfeasible to find two different messages X and Y such that CFF(X)=CFF(Y). The identity function I(X)=X is a CFF and may be used, although for larger data items a cryptographic hash function is generally more efficient. Cryptographic hash functions include SHA or MD5 and are used to reduce the size of messages (i.e. the size of H(X) is less than the size of X) yet H(X) is cryptographically collision-free. The exemplary preprocessing technique shown in FIG. 2 uses a cryptographic hash function to reduce the size of the items. Each data item 201 is hashed at step 202 to produce a fixed-length processed item 203. For example, if the data item consisted of a CA name ("Sample CA") followed by a four-byte serial number (decimal 123456789 with hexadecimal representation 07 5B CD 15), the processed item might be SHA ("Sample CA" | 07 5B CD 15), where "|" denotes concatenation, or:

9D 76 7D 83 1D 85 A2 A8 35 95 08 DB 91 F2 AA DC D8 DD C4 AD.

Figure 3:
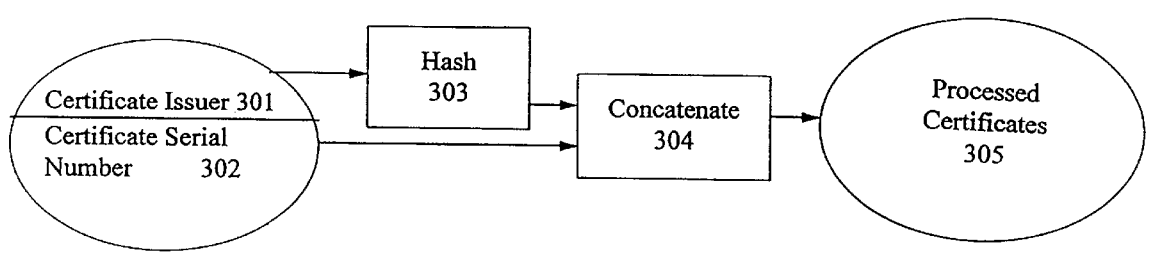
FIG. 3 show a particular preprocessing technique appropriate for digital certificates.

Data items of specific types may use different kinds of preprocessing. FIG. 3 illustrates a particular preprocessing technique appropriate for data items such as digital certificates. The certificate issuer name 301 is hashed at step 303, and at step 304, the hashed issuer name is concatenated with the certificate serial number 302 to produce the processed digital certificate 305. (The serial number could also be hashed before concatenation.) For example, a certificate with a 32-bit (4-byte) serial number 123456789 whose CA name is "Sample CA" would have a 24-byte list entry consisting of SHA ("Sample CA") followed by the byte representation of 123456789. In particular, the hexadecimal representation would be:

E2 CA 64 56 40 BE 99 AC CA 9D 3A 9B 02 97 0D 1E F2 95 8E A0 07 5B CD 15

Figure 4:
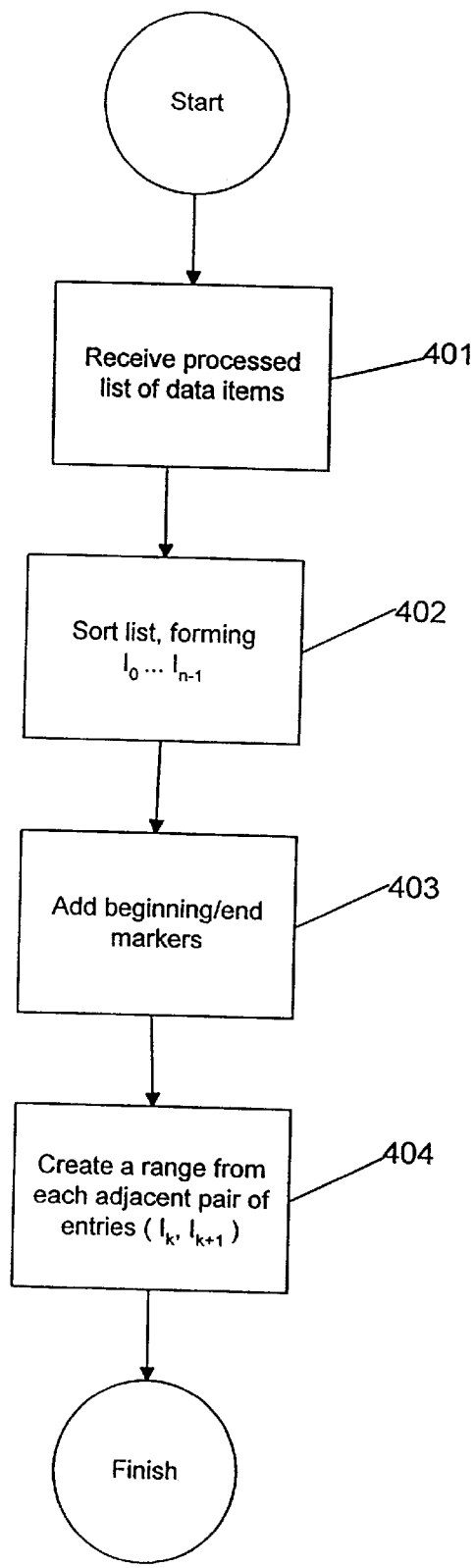
FIG. 4 shows the construction of a set of ranges from a list of data items.

FIG. 4 shows one way to use a computer to convert the set of preprocessed data items into a set of ranges. At step 401, the data items are assembled into a list stored in a computer-readable memory, which is then sorted in ascending order at step 402. At step 403, markers are added to denote the beginning and end of the list. If the data items consist of a 160-bit SHA output, the beginning-of-list marker might consist of 160 zero bits, and the end-of-list marker might consist of 160 one bits. Every pair of adjacent list entries then defines a range where the list entries are the range endpoints. There are no entries on the list which lie between these endpoints (if a value between the endpoints was present on the list, the sorting operation would have placed it between the range endpoints and the range endpoints would thus no longer be adjacent on the sorted list). At step 404, a data structure is constructed specifying the range, typically encoding the range as the minimum (the lesser of the two list entries) and the range maximum (the greater list entry). Other formats for the range data structure are also possible, such as a range endpoint and length, a range midpoint and length, etc. Ranges can also be broken into subranges, although in this case range endpoints would not necessarily correspond to data items on the list. In some cases it is helpful to add additional markers in places other than the beginning and end of the list. For example, if the digital certificate preprocessing technique of FIG. 3 is used and certificates from multiple certificate issuers are present on the list, additional markers might be placed at the beginning and end of the list region corresponding to each certificate issuer. Ranges would only be issued within regions belonging to supported CAs. In general, additional start and stop signals are helpful to define ranges excluded from the list or which are otherwise noteworthy.

Figure 5:
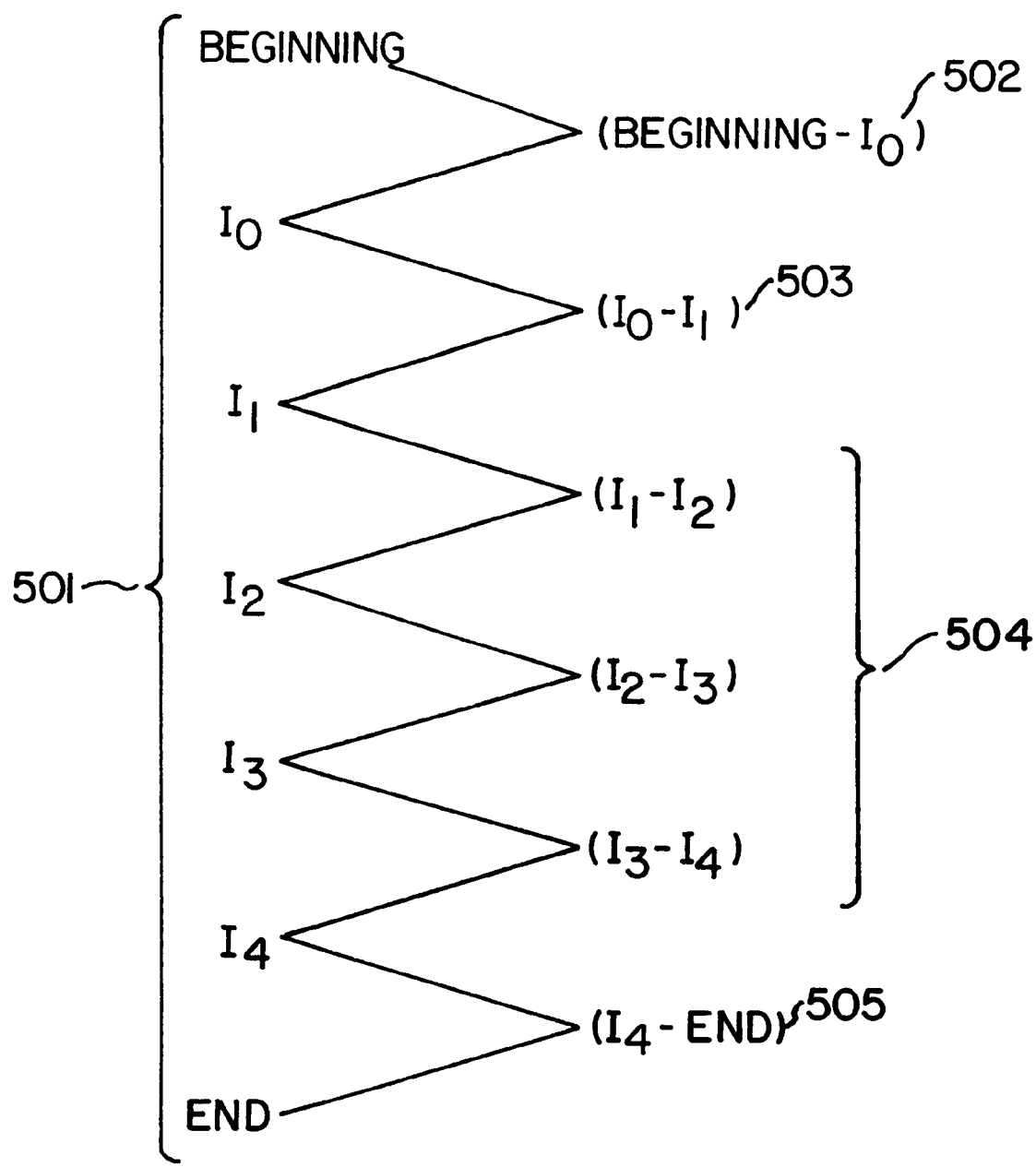
FIG. 5 shows a set of ranges made from a sorted list of data items.

If the initial data set contains n data items, there will be n+2 entries in the sorted list due to the addition of the beginning and end markers. There are n+1 possible pairs of adjacent entries in the sorted list, so there will be n+1 range structures. FIG. 5 shows a set of ranges constructed from a sorted list 501 of five data items $I_0 \ldots I_4$. The first range 502 goes from the beginning-of-list marker to the first data item, $I_0$. The next range 503 goes from $I_0$ to $I_1$. Subsequent ranges 504 are $I_1$–$I_2$, $I_2$–$I_3$, and $I_3$–$I_4$. The final range 505 is $I_4$ through the end-of-list marker.

A hash tree is then built from the sorted list of ranges. A hash tree is a hierarchical data structure comprising a plurality of leaf nodes combined using a cryptographic function to form a lesser number of root nodes such that using one or more applications of the cryptographic hash function it is possible to cryptographically transform any leaf node into a root node. A hash tree where the leaves are intervals (ranges) is called an interval hash tree.

Figure 6:
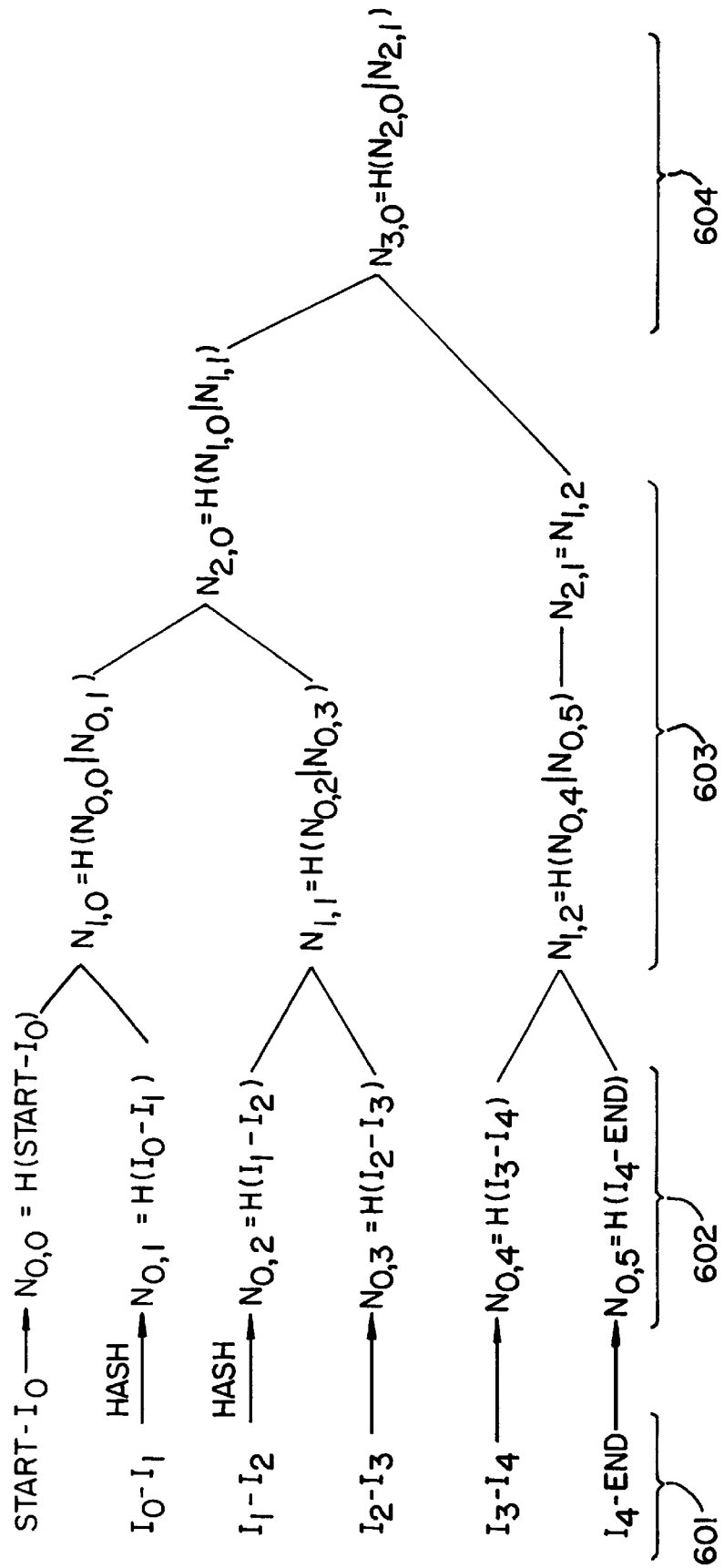
FIG. 6 shows the structure of a binary interval hash tree made from a list containing six ranges.

FIG. 6 shows the structure of a binary interval hash tree built using a set of six ranges 601. The ranges are optionally transformed using a collision-free function to form the tree's leaf nodes 602. The leaf nodes are then combined using a cryptographic hash function to form levels of intermediate nodes 603 and a single root node 604.

Figure 7:
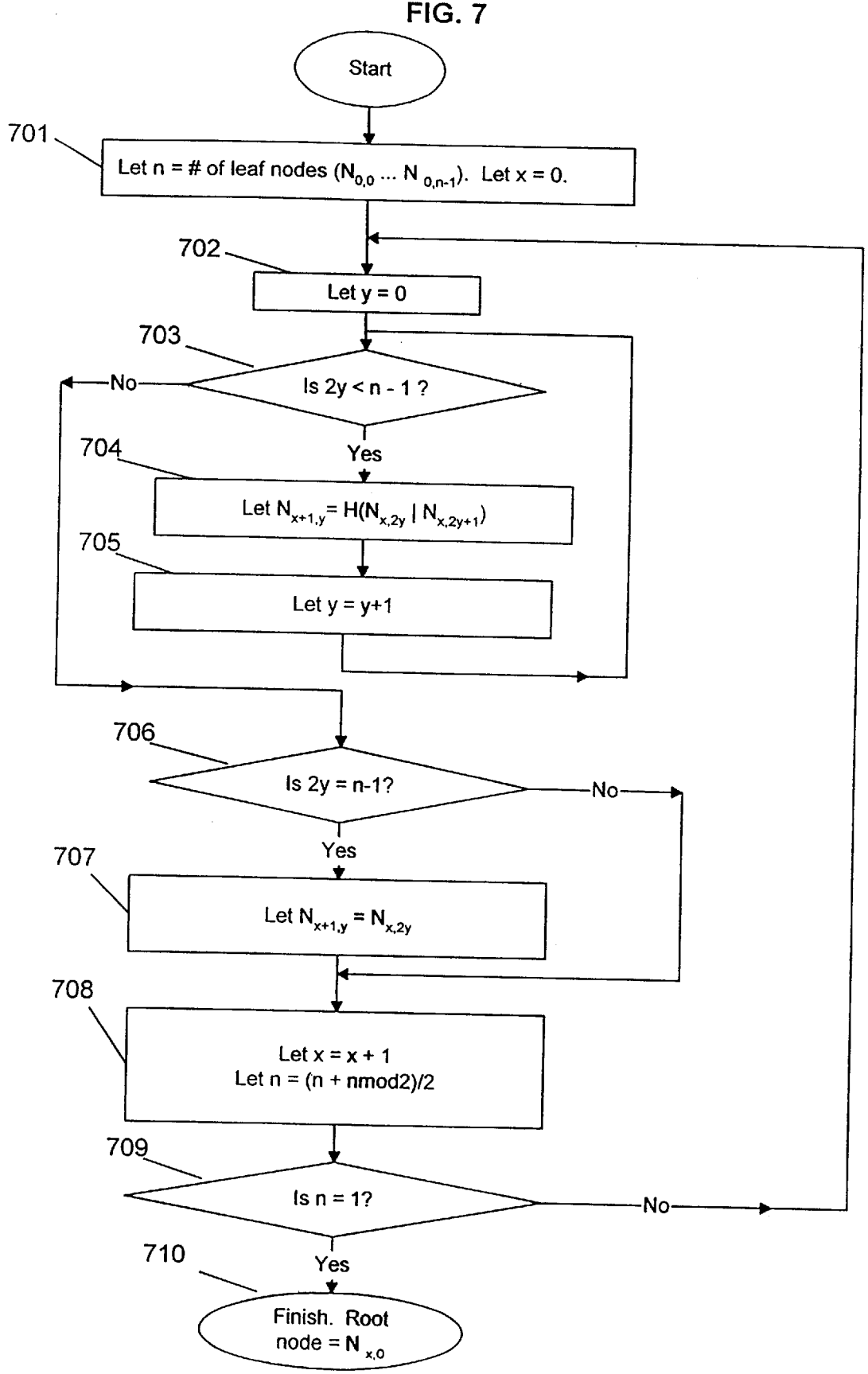
FIG. 7 is a flowchart showing steps to construct an interval hash tree from a set of ranges.

FIG. 7 describes the steps required to use a computer to construct a binary interval hash tree given a set of n leaf nodes $N_{0,0} \ldots N_{0,n-1}$ stored in a computer readable memory. At step 701, the variable n is initialized to the number of leaf nodes and the tree level counter x is initialized to zero. At step 702, the variable y is initialized to zero. At step 703, the device determines whether two times y is smaller than n−1. If so, at least two more nodes are present at the current level x and, at step 704, these are concatenated (as denoted by the symbol "|") and combined with a cryptographic hash function to produce one level x+1 node. At step 705 y is updated then the computer returns to step 703. If the comparison at step 703 is not true, the computer determines at step 706 whether a single level x node remains. If so, the node is simply copied at step 707 to level x+1. The level x+1 nodes are now complete, so at step 708 the device adds one to x so that the next level of nodes can be done. Step 708 also replaces n with the number of nodes in the new level by dividing by 2 while rounding upward. At step 709 the device then determines whether more than one node remains. If so, it returns to step 702. Otherwise the device finishes at step 710, returning the root node which is node $N_{x,0}$.

Figure 8:
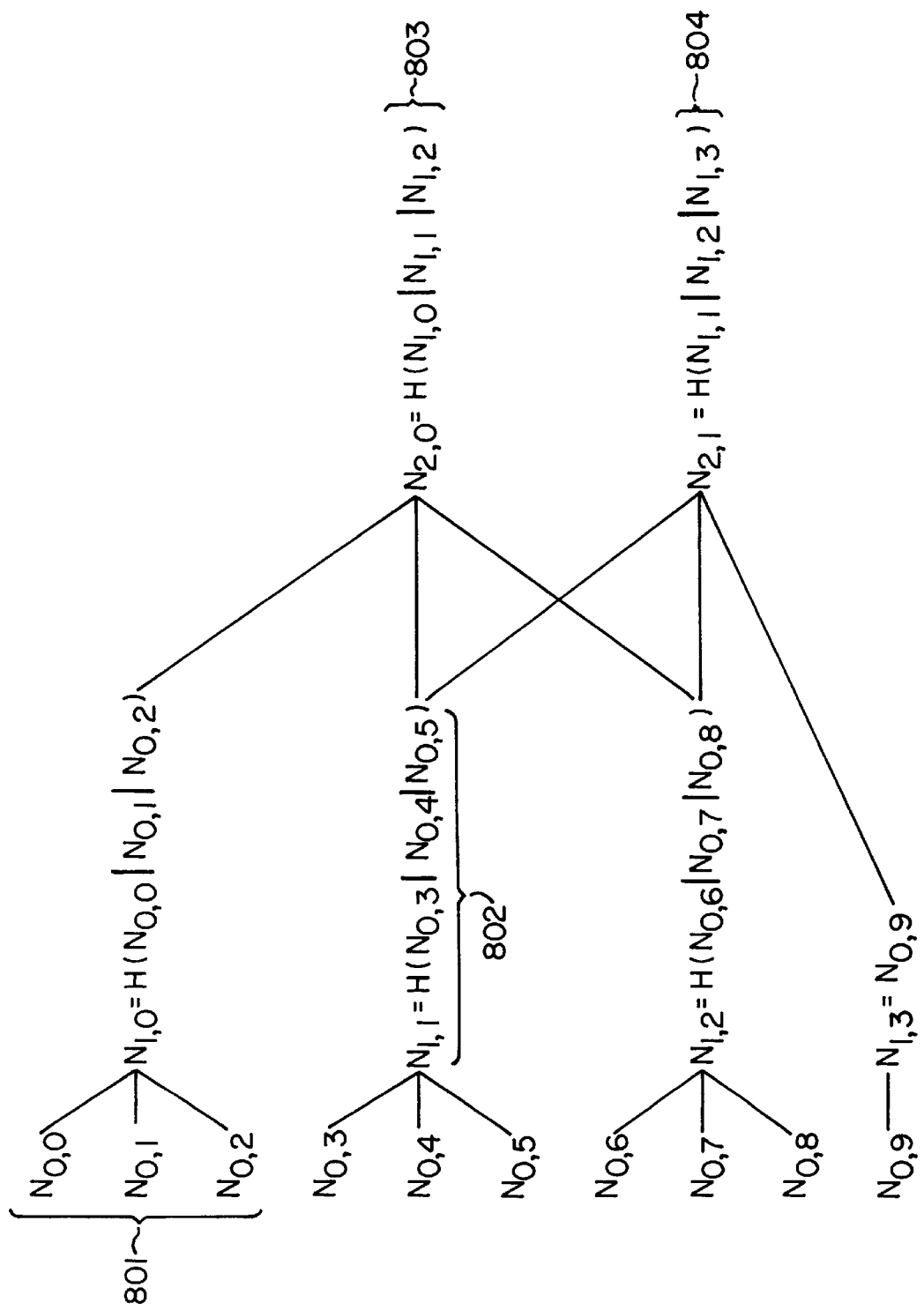
FIG. 8 shows a degenerate interval hash tree.

Although the preferred embodiment uses binary trees (see, e.g., U.S. Pat. No. 4,309,569 to Merkle (1982)), other tree structures are also possible. Variant tree structures, such as those having more than one root node, which combine more than two nodes at once, or which otherwise deviate from the binary tree are called degenerate trees. In some situations it may be desirable to have multiple roots since this can shorten the paths from leaves to roots. FIG. 8 shows an example of a degenerate tree in which groups of three nodes 801 (instead of two) are combined, a level x node 802 (i.e., $N_{1,1}$) is used in computing more than one level x+1 nodes 802 (e.g., $N_{2,0}$ and $N_{2,1}$), and there are two root nodes 803 and 804. It will be apparent to one skilled in the art that a wide variety of degenerate tree structures can be constructed. For example, U.S. Pat. No. 4,881,264 to Merkle (1989) describes several degenerate hash tree structures which may be used in connection with the present invention.

Figure 9:
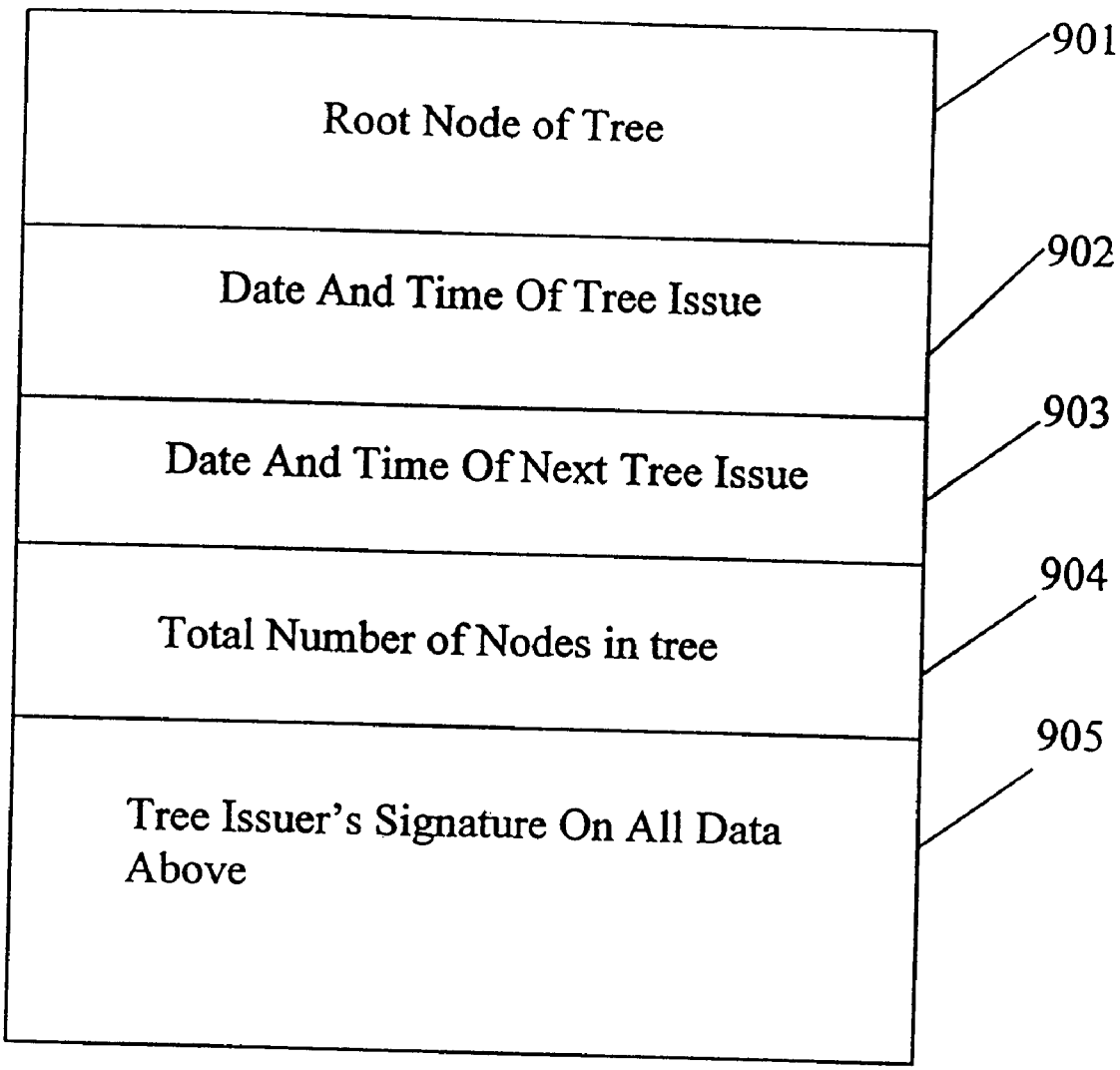
FIG. 9 shows the contents of a digitally-signed root node.

Referring to FIG. 9, after constructing the hash tree, the tree issuer uses RSA, DSA, or another signature algorithm to digitally sign the tree's root node 901, the date and time of the tree's issuance 902, the date and time of the next issuance (optional) 903, and the total number of nodes in the tree 904. The structure might also include other information, for example (but not limited to) the signing algorithm identifier, the tree issuer's name, and the root node of the previous tree.

To summarize, the tree issuer thus performs the following steps:

1. Construct the list of items,
2. Convert list into a set of ranges,
3. Build an interval hash tree from the ranges,
4. Digitally sign the hash tree's root node, and
5. Publish the hash tree and signed root node.

Figure 10:
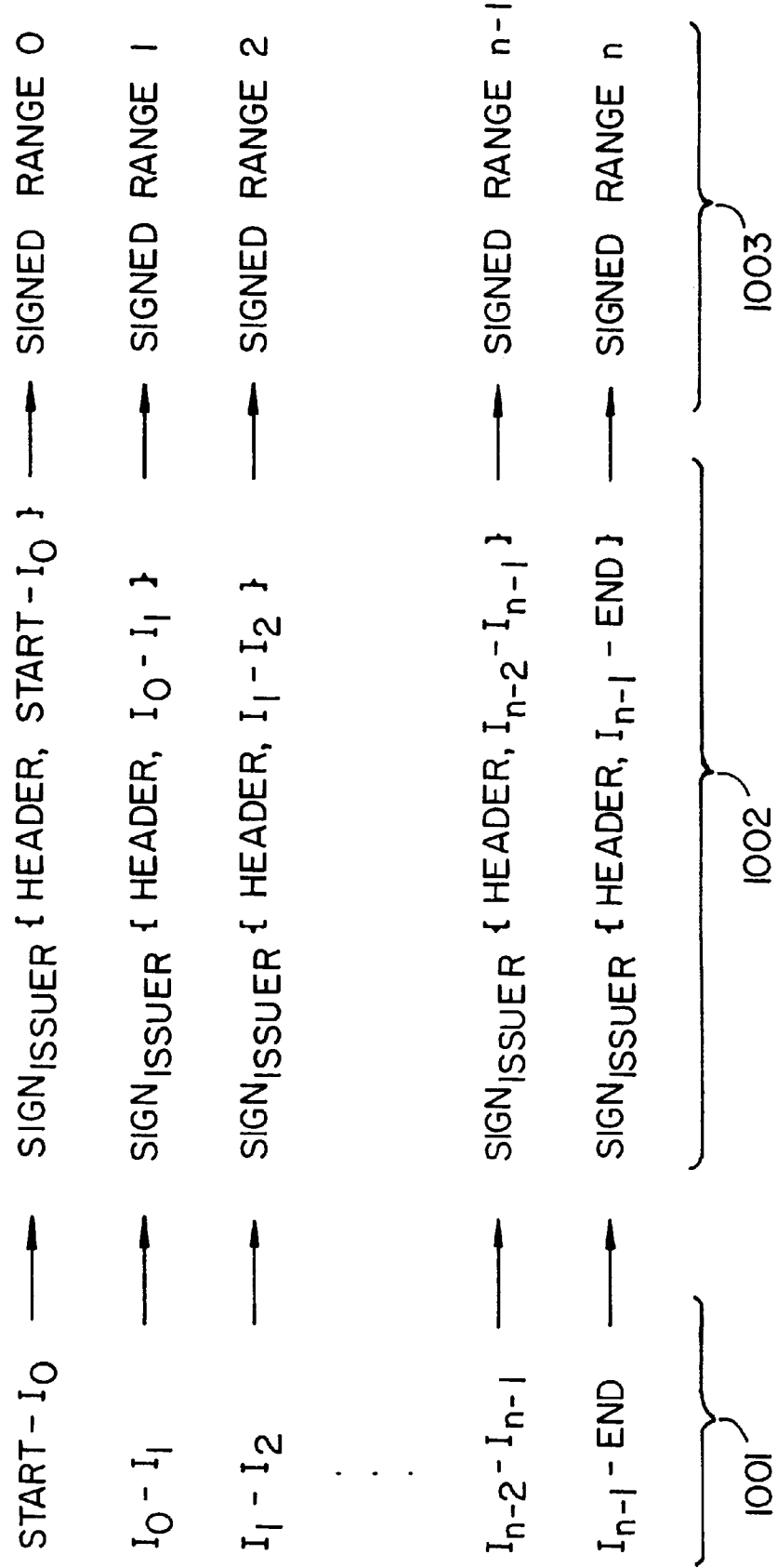
FIG. 10 shows an alternate embodiment of the invention, without a hash tree, in which the individual ranges are signed directly.
Figure 11:
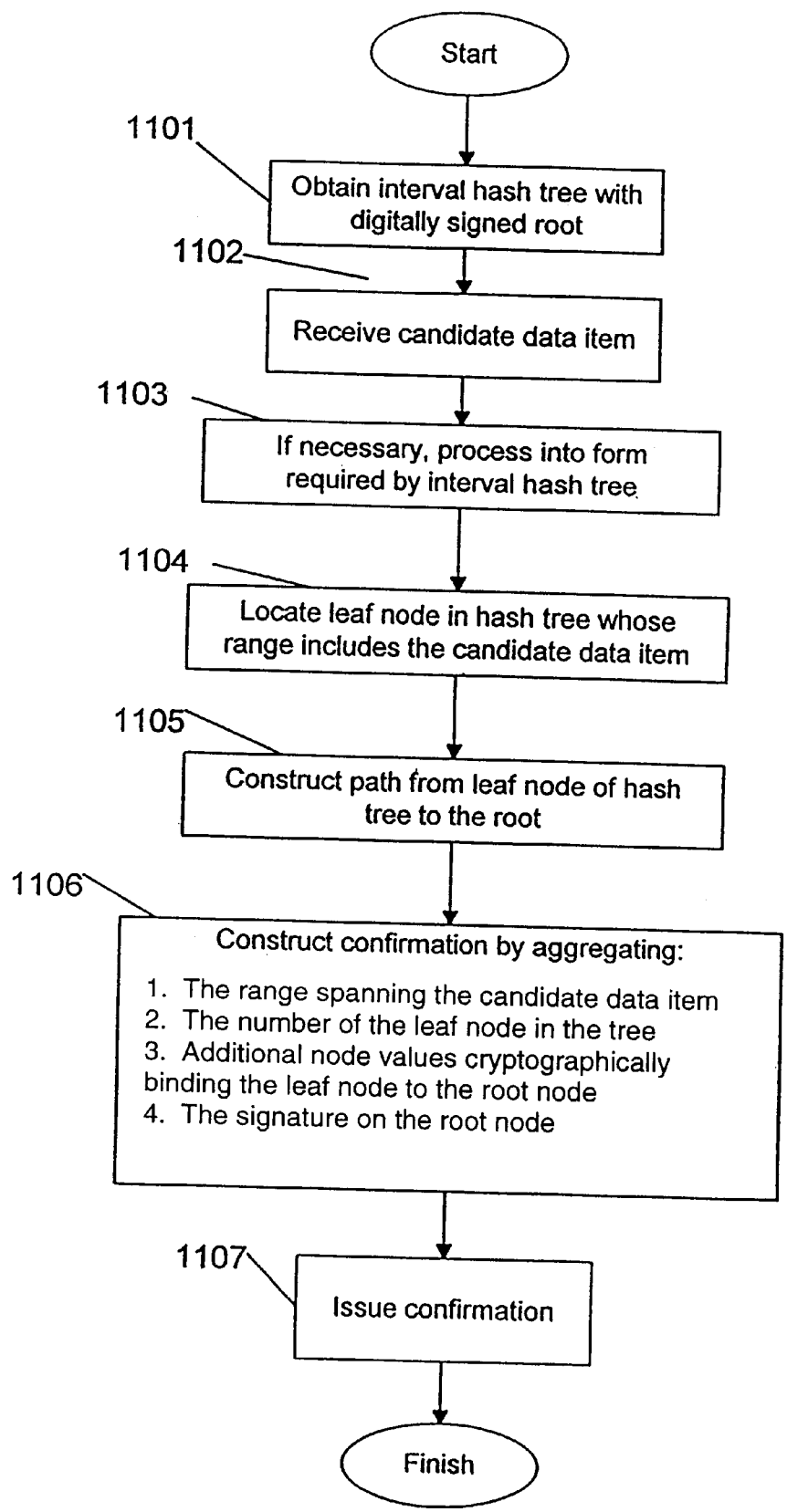
FIG. 11 shows the steps taken by the confirmation issuer to issue a confirmation for a specified candidate item.

The foregoing illustrates the preferred embodiment of the invention in which hash trees are used. Alternatively, FIG. 10 shows a treeless variant in which the individual ranges 1001 are signed directly at 1002 to produce a set of signed ranges 1003.

Confirmation Issuance

Corresponding to the embodiments of the invention disclosed in FIGS. 2-9, FIG. 11 outlines a process for issuing cryptographic assurances as to whether specific items are on a list. The list is the plurality of data items used to generate the ranges for an interval hash tree, and the confirmation will directly demonstrate whether a candidate data item belongs to the plurality of items (i.e., is present on the list). At step 1101, the confirmation issuer first obtains the interval hash tree (or information allowing the confirmation issuer to construct at least the required portions of the tree) along with its digitally signed root node. At step 1102, the confirmation issuer receives a candidate data item for which the confirmation is to be constructed. At step 1103, the confirmation issuer performs any required preprocessing steps. At step 1104, the confirmation issuer identifies a leaf node representative of the candidate item. In one embodiment of the invention, the identified leaf node has a lesser range endpoint which is no larger than the candidate item and a larger range endpoint which is no smaller than the candidate item. Next, at step 1105, a list is made specifying the intermediate nodes needed to cryptographically reconstruct the path binding the leaf to the root node (FIG. 12 describes in detail the steps required to locate the appropriate intermediate nodes). At step 1106, the final confirmation including the contents of the range that spans the candidate data item, the number of the specified leaf node in the tree, the additional nodes which cryptographically bind the leaf to the root node, and the digitally-signed root node, is produced. Note that the confirmation does not include the entire list of data items represented by the leaf nodes of the interval hash tree. Finally, at step 1107, the confirmation issuer issues the confirmation to the party requesting it. The requesting party may be either a party wishing to know the status of the candidate item, or it may be an intermediate in a communications channel. For example, the requesting party might be the owner of a certificate which will store the confirmation and supply it to any other parties which want to verify the status of its certificate. In this case, the confirmation is communicated by the confirmation issuer to the verifier via the certificate holder. Alternatively, the confirmation might be requested by the party which wishes to verify the certificate's status.

Figure 12:
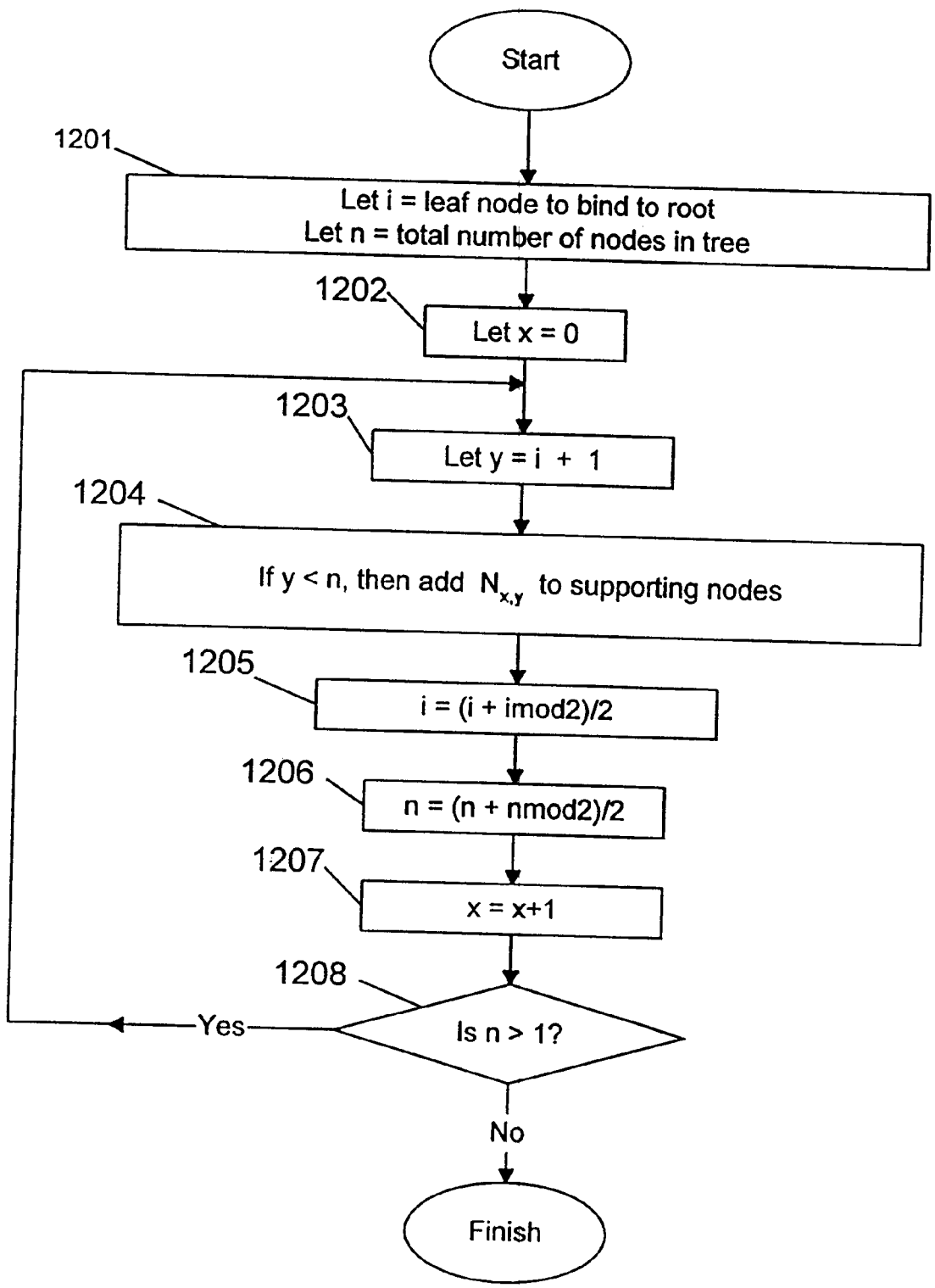
FIG. 12 is a flowchart showing steps to construct a list of supporting nodes cryptographically binding a leaf node to the root node.

FIG. 12 describes steps to find the intermediate nodes needed to cryptographically bind a leaf node ($N_{0,i}$) to the root node of a binary interval hash tree. The process begins at step 1201 by setting node counter n to the total number of leaf nodes in the tree and i to the vertical position of the leaf node to be bound to the root. At step 1202, x is initialized to zero. At step 1203, the device computes i⊕1, where "⊕" denotes an exclusive-OR operation. Equivalently, step 1203 could be defined as y=i+1−2(i mod 2). At step 1204, if y is less than the total number of level x nodes (hashes) then $N_{x,y}$ is added to the list of hashes binding the specified leaf to the root. At step 1205, i is divided by 2 and rounded upward to find the vertical position of the level x+1 node leading to the root. At step 1206, n is updated to equal the number of level x+1 nodes. At step 1207, x is incremented. At step 1208, the device tests whether n is larger than 1 and, if so, loops back to step 1203.

To summarize, the confirmation issuer obtains the hash tree and signed root, receives a confirmation request, and constructs and issues the confirmation. When the hash tree is about to expire or a new tree is available, the confirmation issuer obtains an updated tree.

Verification

Figure 13:
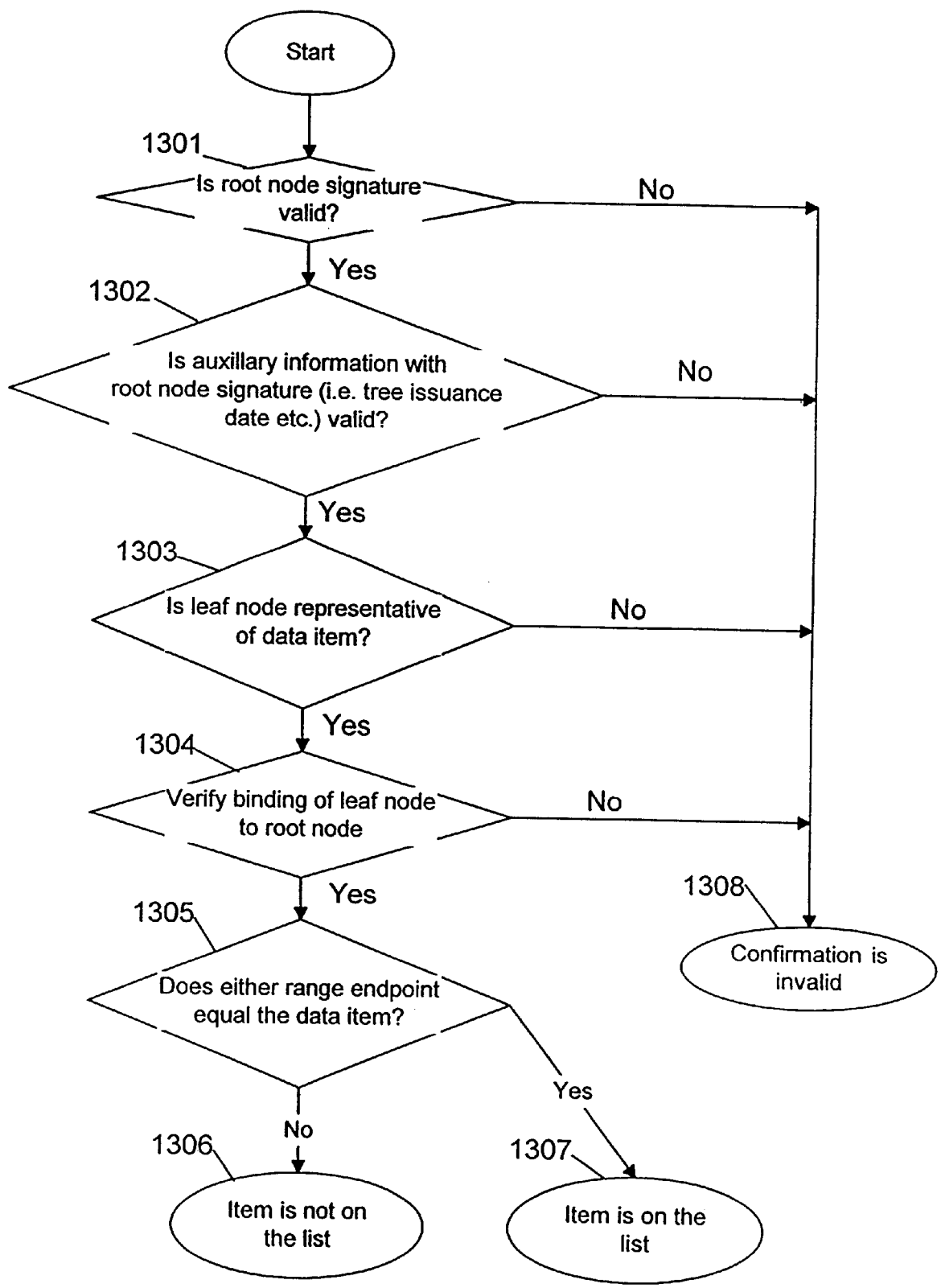
FIG. 13 shows the steps typically taken by the verifier to determine whether a confirmation message provides acceptable cryptographic proof of the status of an item.
Figure 14:
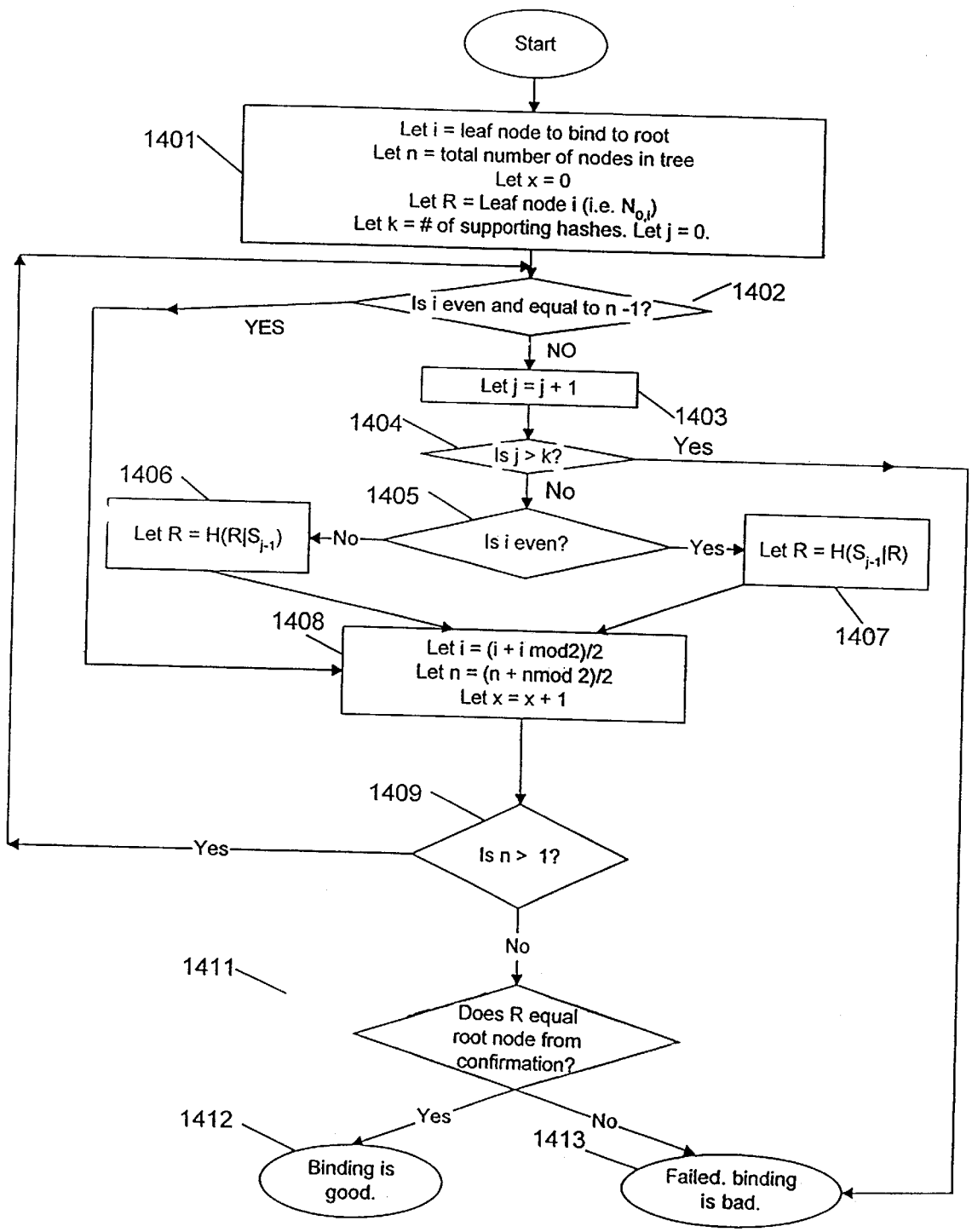
FIG. 14 is a flowchart showing how to use a set of supporting nodes to verify the cryptographic binding between a leaf node and the root node.

FIG. 13 outlines the steps taken by a verifier to use a confirmation message stored in a computer readable memory to cryptographically determine the status of a candidate data item with respect to the list. At step 1301, the verifier first uses the tree issuer's public key (which is assumed to be previously known and trusted) to check the digital-signature on the root node. At step 1302, the verifier then checks the date and time of the tree's issuance, along with any other auxiliary information signed with the root, to ensure that the tree is acceptable. At step 1303, the verifier confirms that the leaf node is representative of the data item. In particular, the leaf's lesser range endpoint should be no larger than the data item and the larger range endpoint should be no smaller than the data item. At step 1304, the verifier uses the supporting nodes to check the cryptographic binding between the leaf node and the root node (FIG. 14 shows the steps required to verify the cryptographically binding between a leaf node and the root node in a binary tree). If any steps fail, the verifier skips to step 1308 and the confirmation is invalid. If all steps above are successful, the verifier checks at step 1305 whether either endpoint of the leaf node's range equals the candidate data item. If the candidate data item lies between the endpoints of the range, the verifier concludes at step 1306 with assurance that the item is not on the list. If the item in question equals one of the range endpoints, the verifier concludes at step 1307 with assurance that the item is on the list.

FIG. 14 outlines the process of using a set of supporting nodes to verify the cryptographic binding between the leaf node representative of the candidate data item and the root node. At step 1401, the variable i is initialized to the number of the leaf node in the tree, n is initialized to the number of nodes in the tree, x is initialized to zero, R is initialized to the leaf node (i.e., $N_{0,i}$), and k is initialized to the number of supporting hashes provided. Note that n was checked along with the digital-signature on the root node. At step 1402, the device checks whether i is even and equal to n−1. If so, the device skips directly to step 1408, but otherwise the device proceeds to step 1403 and increments j. At step 1404, the device ensures that j (the number of supporting hashes used) never exceeds k (the total number of supporting hashes provided). At step 1405, the verifier determines whether i is even or odd. If i is odd, the verifier proceeds to step 1406 where the new value for R is found by concatenating the existing R with the next supporting hash ("|" denotes concatenation) and hashing the result with a cryptographic hash function. If i is even, the verifier proceeds instead to step 1407, where the new value for R is found by concatenating the existing next supporting hash with the existing R (in the opposite order from step 1406) and hashing the result with a cryptographic hash function. After step 1406 or 1407, the verifier proceeds to step 1408 and divides i by 2 (rounding upward), divides n by 2 (rounding upward), and increments x. At step 1409 the verifier checks whether the main loop is complete, returning to step 1402 if n has not yet reached one. If the loop has finished, the verifier finally checks, at step 1411, whether R corresponds to the expected value of the root node from the confirmation. If R corresponds to the root node, the verifier concludes at step 1412 that the binding is good. If R does not correspond to the root node, the verifier concludes at step 1413 that the binding is bad.

Figure 15:
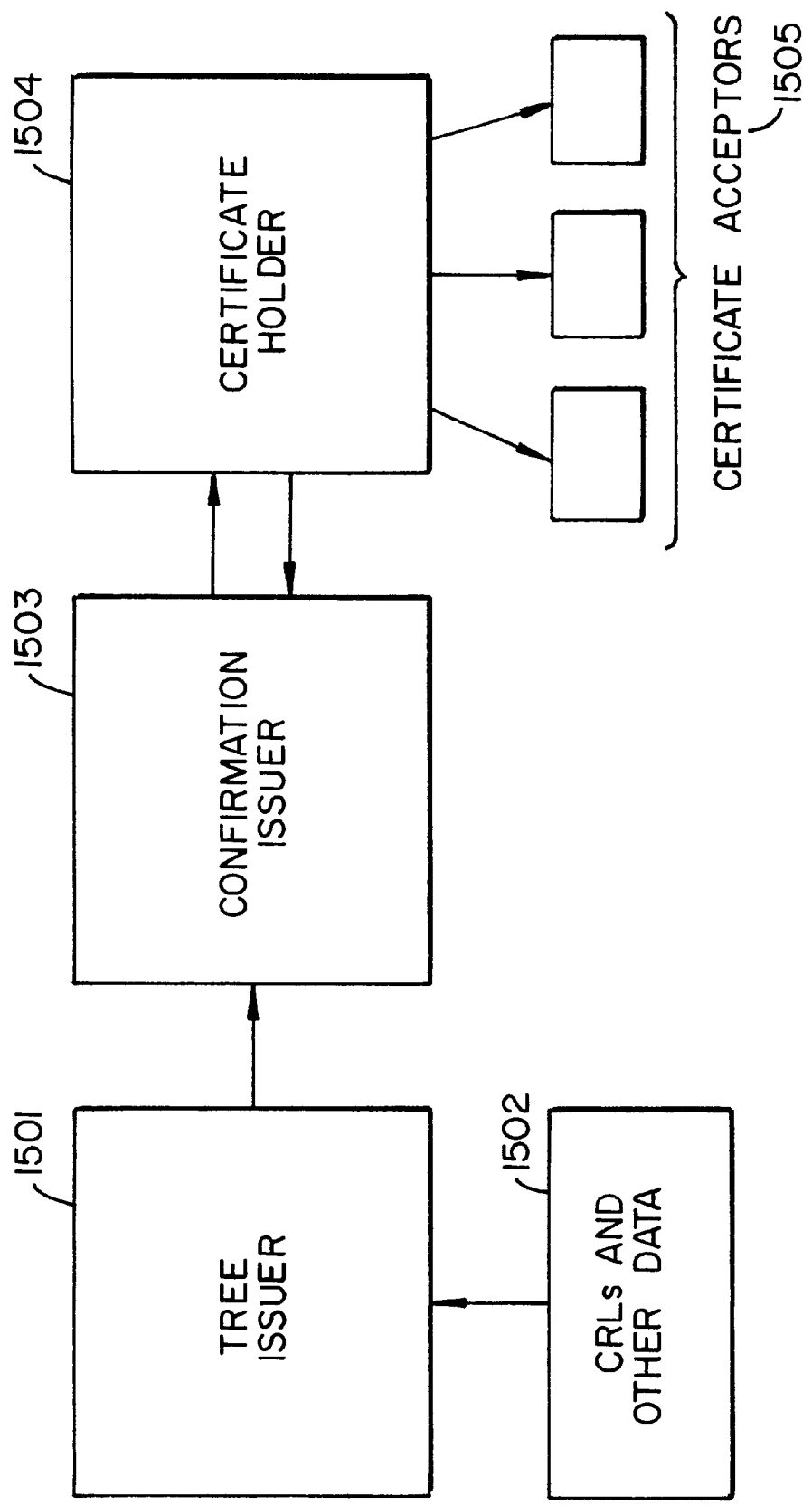
FIG. 15 outlines the operation of a communications system which a certificate holder uses to obtain confirmation messages which it provides to certificate acceptors as cryptographically-secure evidence that the certificate has not been revoked.

FIG. 15 outlines the operation of a system which uses the invention to determine whether certificates have been revoked. The tree issuer 1501 constructs a list of revoked certificates by obtaining CRLs or other revocation messages 1502. The tree issuer then constructs an interval hash tree including the digitally signed root node(s). The confirmation issuer 1503 obtains the tree's signed root from the tree issuer over a communications channel. The confirmation issuer also obtains, typically also from the tree issuer, the rest of the tree or the leaf nodes needed to reconstruct the tree. The owner of a certificate 1504 submits its certificate to the confirmation issuer, which responds with a confirmation. The certificate holder can then provide the confirmation along with its certificate to certificate acceptors 1505, which each verify the confirmation message to confirm that the certificate has not been revoked. Participants in the protocol can verify the operation of the tree issuer to detect attempts at fraud. In particular, the tree should include all revoked certificates with no unauthorized additions. For every certificate included in the tree, the tree issuer should be able to provide a CRL or other acceptable evidence of revocation. In some cases, such as if a CA stops issuing CRLs, the tree issuer can optionally define alternate mechanisms for adding entries to the list. In general, the tree issuer can determine the criteria for including items in the list, allowing the addition of new revocation mechanisms, such as revocation by certificate holders. Even so, the operation of the tree issuer is open to public scrutiny. In particular, third parties can verify that the tree's leaf nodes specify only properly-revoked certificates and that no revoked certificates were omitted. The third party can also confirm that the leaf nodes' ranges were constructed properly and detect any other abnormalities.

Those skilled in the art will appreciate that many simple variant forms of the invention are possible. For example, in another embodiment of the invention, the hash tree can be constructed using the sorted list of items (rather than ranges) as leaf nodes, in which case confirmations will consist of a pair of adjacent leaf nodes whose values span the candidate item, the intermediate nodes connecting the leaf nodes to the root, and the digitally-signed root. It is also possible to combine the functionality of the tree issuer and confirmation issuer within a single entity. In yet another embodiment of the invention, a trusted confirmation issuer can generate digitally-signed assurances as to the status of candidate items on the list, rather than including a chain of nodes from the interval hash tree as part of the confirmation. Finally it is also possible for the confirmation issuer to issue confirmations without receiving an explicit request.

Conclusions

Accordingly, the reader will see that this invention can be used to efficiently and securely demonstrate the presence or absence of items on a list. Traditional solutions to this problem are inefficient in that an amount of data must be downloaded that is proportional to the number of items on the list. In contrast, the present invention provides tremendous savings for large lists. For example, by using binary interval hash trees, the amount of data required is proportional to the base-2 logarithm of the total list size. Construction of such hash trees is easy, requiring only (2n−1) cryptographic hash operations, where n is the number of leaves in the tree. Furthermore, construction of confirmation messages can be done efficiently and easily using insecure hardware since no private key operations are performed by the confirmation issuer.

Reliable and efficient verification of certificate revocation status is absolutely essential for secure World Wide Web transactions, Internet-based EDI, distributed design and manufacturing collaboration, financial transaction security, secure exchange of electronic mail, communication of medical records, and other applications requiring digital certificates. Using this invention, parties holding digital certificates can obtain tree leaves corresponding to their own certificates and supply the tree and corresponding signature information along with the certificate. This eliminates the need for certificate recipients to independently download a CRL. Furthermore, the number of extra network connections involved in certificate revocation status is small, since a certificate holder can use a single nonrevocation proof for many transactions.

Although the description above contains many specificities, these should not be construed as limiting the scope of the invention but merely providing illustrations of some of the exemplary embodiments thereof. For example, the security system can be used with many sorts of data, including but not limited to lists of revoked certificates, revoked digital signatures on computer-executable code (such as executable code, object code, source code, interpreted code, etc.), lists of other types of revoked digital signatures of other types, lists of authorized users, lists of unauthorized users, lists of stolen credit card numbers, and lists of bad checks. In general, the invention is useful whenever it is necessary to determine in a secure manner whether or not a particular value is on a list. The system can be implemented using almost any computer technology, including almost any software language (Pascal, C, C++, assembly language, FORTRAN, etc.) or integrated circuit manufacturing technology.

What is claimed is:

1. A method comprising the computer implemented steps of:
   where each digital certificate in a superset of issued digital certificates is associated with a unique data item, sorting those data items associated with a plurality of revoked digital certificates belonging to said superset of issued digital certificates;
   deriving a plurality of ranges using adjacent pairs of data items in said sorted data items as endpoints such that all data items associated with said plurality of revoked digital certificates are at endpoints of said plurality of ranges and such that all data items associated with unrevoked digital certificates fall in-between the endpoints of said plurality of ranges, wherein each adjacent pair of data items in said sorted data items is used to derive a different one of said pluralitv of ranges;
   digitally signing each of the plurality of ranges individually, wherein the plurality of ranges and said digital signatures cryptographically demonstrate whether any given digital certificate is one of said plurality of revoked digital certificates; and
   electronically transmitting said plurality of ranges and said said digital signatures onto a network and using them in cryptographically demonstrating whether any given digital certificate is one of said plurality of revoked digital certificates, wberein a given one of said pilrality of ranges together with the digital signature of that range cryptographically demonstrates whether a given digital certificate within that range is one of the plurality of revoked digital certificates.

2. The method of claim 1, further comprising the step of:
   hashing at least the serial number from each of the plurality of revoked digital certificates to generate said unique data items.

3. A method comprising the computer implemented steps of:
   receiving a request message requesting whether a first digital certificate is one of a plurality of revoked digital certificates belonging to a superset of issued digital certificates, where each digital certificate in said superset of issued digital certificates is associated with a unique data item;
   selecting a range having as endpoints the unique data items associated with the pair of revoked digital certificates in said plurality of revoked digital certificates that defines the smallest range of the unigue data items that includes said first digital certificate, wherein the first digital certificate is not one of the plurality revoked digital certificates if the unique data item associated with the first digital certificate is in-between the endpoints of the range, and wherein the first digital certificate is revoked if the unique data item associated with the first digital certificate is one of the endpoints of the range;
   forming a response message including the unique data items that are the endpoints of the range and including a digital signature on the range, said response message cryptographically demonstrating whether said first digital certificate is one of said plurality of revoked digital certificates; and
   electronically transmitting the response message onto a network.

4. The method of claim 3, wherein ranges are derived from adjacent pairs of data items in a sorted list of the data items associated with said plurality of revoked digital certificates.

5. The method of claim 3, wherein said digital signature is on the endpoints of the selected range independently hashed and then hashed together.

6. The method of claim 3, wherein said digital signature is on the endpoints of the selected range hashed together.

7. The method of claim 3, wherein said digital signature is on the endpoints of the selected range independently hashed and then concatenated.

8. A method comprising the computer implemented steps of:
   electronically transmitting a request message as to whether a first digital certificate is one of a plurality of revoked digital certificates belonging to a superset of issued digital certificates, where each digital certificate in said superset of issued digital certificates is associated with a unigue data item;

receiving a response message that cryptographically demonstrates whether said first digital certificate is one of said plurality of revoked digital certificates, said response message identifying a range having as endpoints the data items associated with the pair of revoked digital certificates in said plurality of revoked digital certificates that defines the smallest range of the data items that includes said first digital certificate, said response message also including a digital signature on said range, wherein the first digital certificate is not one of the plurality of revoked digital certificates if the unique data item associated with the first digital certificate is in-between the endpoints of the range, and wherein the first digital certificate is revoked if the unigue data item associated with the first digital certificate is one of the endpoints of the range; and determining if said first digital certificate is one of said plurality of revoked digital certificates based on said range by, detemining whether the unique data item associated with said first digital certificate is either in-between the endpoints of said range, one of the endpoints of said range, or outside said range, and validating said digital signature.

9. The method of claim 8, wherein said range is derived from an adjacent pair of data items in a sorted list of the data items that identify said plurality of revoked digital certificates.

10. The method of claim 8, wherein said digital signature is on the endpoints of said range independently hashed and then concatenated.

11. The method of claim 8, wherein the unique data item associated with each digital certificate is a hash of at least the serial number from that digital certificate.

* * * * *

UNITED STATES PATENT AND TRADEMARK OFFICE
CERTIFICATE OF CORRECTION

PATENT NO. : 5,903,651
DATED : May 11,999
INVENTOR(S) : Kocher

It is certified that error appears in the above-identified patent and that said Letters Patent is hereby corrected as shown below:

In column 3, at line 25, delete " reduce".
In column 12, at line 7, delete first occurance of "said".
In column 12, at line 10, delete "wberein" and insert --wherein--.
In column 12, at line 11, delete "pilrality" and insert --plurality--.
In column 12, at line 31, delete "unigue" and insert --unique--.
In column 12, at line 67, delete "unigue" and insert --unique--.
In column 13, at line 15, delete "unigue" and insert --unique--.

Signed and Sealed this

Fifteenth Day of May, 2001

Attest:

NICHOLAS P. GODICI

Attesting Officer

Acting Director of the United States Patent and Trademark Office